United States Patent [19]
Gruetzmacher

[11] Patent Number: 5,937,371
[45] Date of Patent: Aug. 10, 1999

[54] INCLINOMETER WITH DUAL SCALES AND PARALLEL GAUGING SURFACES

[75] Inventor: Richard J. Gruetzmacher, Colgate, Wis.

[73] Assignee: Johnson Level & Tool Mfg. Co., Inc., Mequon, Wis.

[21] Appl. No.: 09/027,547

[22] Filed: Feb. 20, 1998

[51] Int. Cl.⁶ .................................................. G01C 7/30
[52] U.S. Cl. .................. 702/154; 702/150; 702/151; 33/308; 33/340; 33/391; 33/471
[58] Field of Search .................... 702/154, 150, 702/151; 33/471, 391, 340, 341, 343, 308

[56] References Cited

U.S. PATENT DOCUMENTS

| | | |
|---|---|---|
| D. 348,848 | 7/1994 | Bauer . |
| 559,090 | 4/1896 | West . |
| 2,421,754 | 6/1947 | Little et al. . |
| 2,826,823 | 3/1958 | Hagner . |
| 4,144,653 | 3/1979 | Gardner ..................................... 33/391 |
| 4,492,029 | 1/1985 | Tanaka et al. .............................. 33/366 |
| 4,604,812 | 8/1986 | Arjomand . |
| 4,912,662 | 3/1990 | Butler et al. . |
| 4,995,169 | 2/1991 | Lunden . |
| 5,283,957 | 2/1994 | Chou .......................................... 33/391 |
| 5,546,670 | 8/1996 | Chiang . |
| 5,586,395 | 12/1996 | Malczewski ................................ 33/471 |

Primary Examiner—John E. Barlow, Jr.
Assistant Examiner—Hien Vo
Attorney, Agent, or Firm—Andrus, Sceales, Starke & Sawall

[57] ABSTRACT

An inclinometer for providing two different, direct readings corresponding to the angle of inclination of a worksurface includes a pair of parallel gauging surfaces engageable with the worksurfaces in first and second distinct positions. The inclinometer includes a body which defines the gauging surfaces, and a pointer is mounted to the body and is biased toward a predetermined orientation when either gauging surface is placed on the worksurface. The body carries two differently calibrated scales, one of which is oriented so as to interact with the pointer when a first one of the gauging surfaces rests on the worksurface and the other of which interacts with the pointer to provide a second reading when a second one of the gauging surfaces is placed on the worksurface. The scales may be calibrated to provide an angle reading and a pitch reading, and are preferably applied to a cover plate which overlies a cavity defined by the body within which the pointer is pivotably mounted.

15 Claims, 1 Drawing Sheet

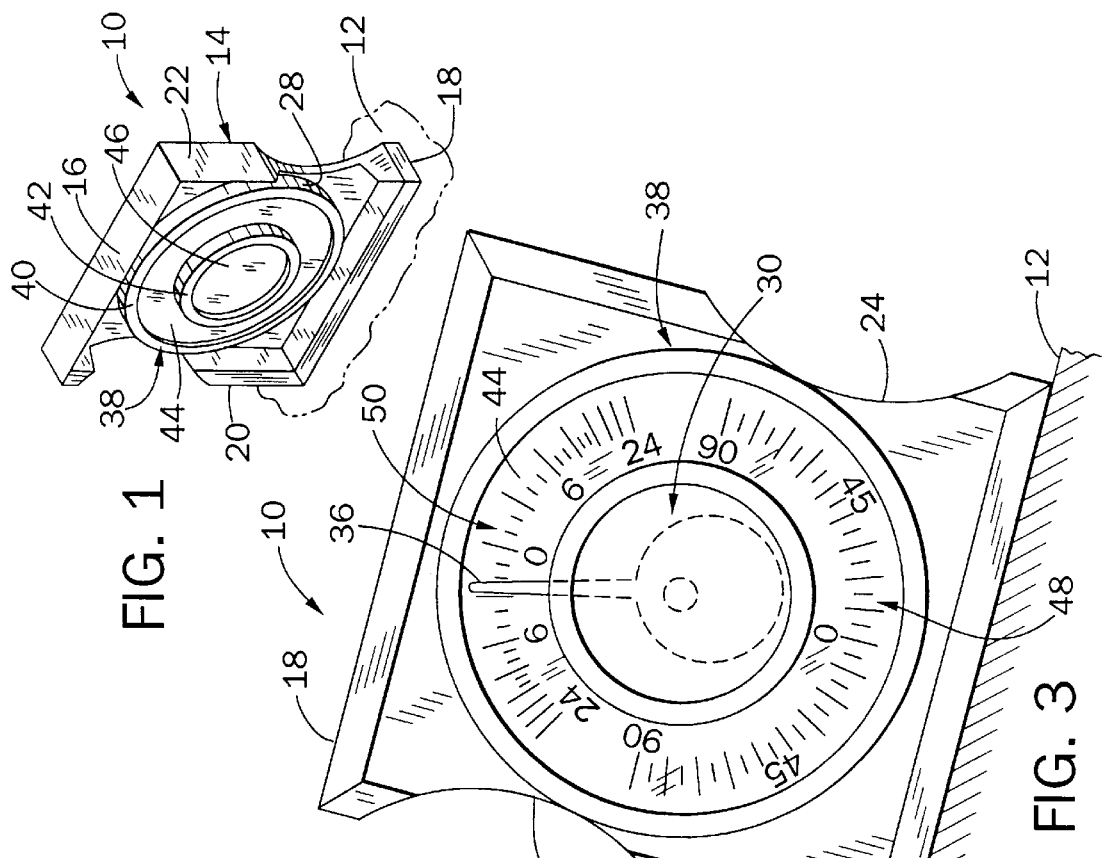
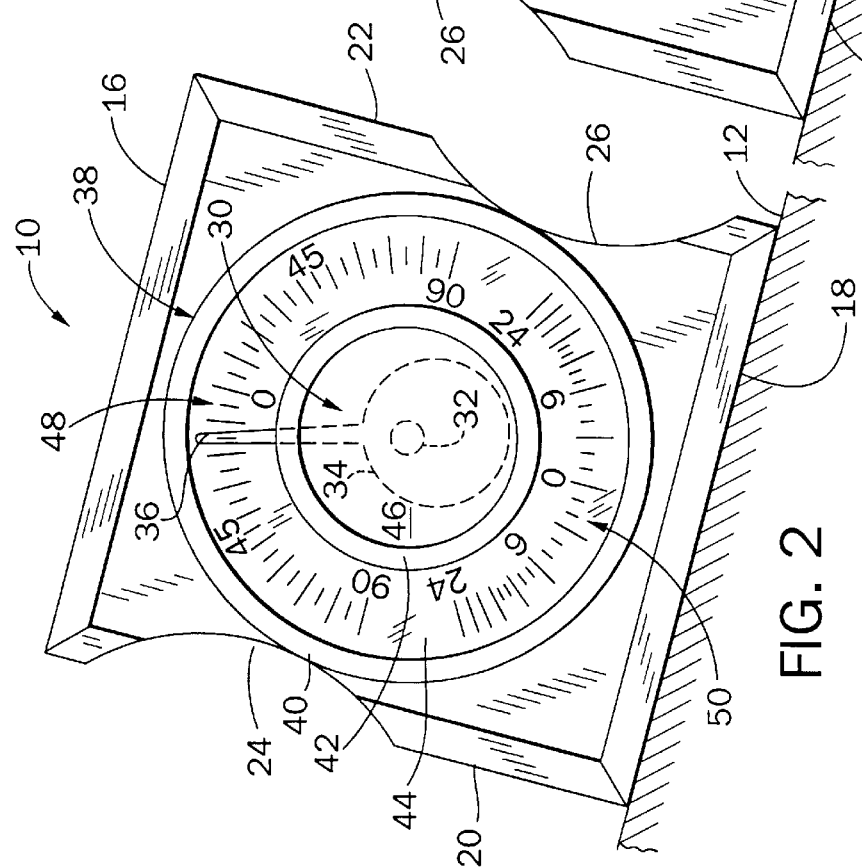
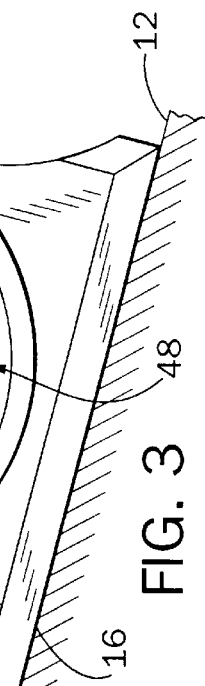

5,937,371

INCLINOMETER WITH DUAL SCALES AND PARALLEL GAUGING SURFACES

BACKGROUND AND SUMMARY OF THE INVENTION

This invention relates generally to an inclinometer, and more particularly to an inclinometer for providing a reading corresponding to the angle of a worksurface when the inclinometer is placed on the worksurface in a predetermined orientation.

Inclinometers are typically used to determine the angle of a worksurface, such as the surface of an inclined piece or member in a construction application. Prior art inclinometers include a body defining a gauging surface adapted for placement against the worksurface, in combination with a pointer pivotably mounted to the body. A scale is associated with the body, and interacts with the pointer to provide a reading of the angle of the worksurface when the gauging surface is placed on the worksurface.

While inclinometers of this type are useful in measuring the angle of a worksurface, it is often necessary to know the pitch of a worksurface, typically in a rise per run reading. With prior art inclinometers, the user obtains a pitch reading utilizing a conversion which is typically set forth in a table or chart located on a surface of the inclinometer, typically the rear surface of the inclinometer. The conversion chart or table is usually printed on an adhesive label along with the equation used to create the chart or table, and the label is applied to the rear surface of the inclinometer. The conversion equation enables the user to provide an individual calculation of the pitch for any given angle read by the inclinometer that is not shown on the chart or table. In any event, a conversion step must be undertaken in order to obtain a pitch measurement from the angle measurement obtained by directly reading the inclinometer.

It is an object of the present invention to provide an inclinometer for providing two different direct readings, such as angle and pitch, corresponding to the angle of a worksurface without the need to refer to a table, chart or equation. It is a further object of the invention to provide such an inclinometer which is used in generally the same way as prior art inclinometers. Yet another object of the invention is to provide dual direct inclinometer readings utilizing a single pointer.

In accordance with one aspect of the invention, an inclinometer for providing a reading corresponding to the angle or inclination of a worksurface includes a body and a pointer mounted to the body for pivoting movement about a pivot axis. A first scale is carried by the body and is positioned so as to provide a first reading from the pointer when the body is in a first position relative to the worksurface. A second scale is carried by the body and is positioned to provide a second reading from the pointer when the body is in a second position relative to the worksurface. Both the first and second readings relate to the angle of the worksurface, and illustratively may be an angle reading and a pitch reading. The body preferably defines a pair of gauging surfaces, a first one of which is engaged with the worksurface to place the body in the first position and a second one of which is engaged with the worksurface to place the body in the second position. In this manner, the first reading is obtained by interaction of the pointer with the first scale when the first gauging surface is engaged with the worksurface, and the second reading is obtained by interaction of the pointer with the second scale when the second gauging surface is engaged with the worksurface. The pointer is preferably weighted and includes an arm terminating in a point, such that the arm is biased toward a predetermined positioned, such as vertical, when the inclinometer is in use. The pointer is preferably disposed within a cavity defined by the body, and a cover member overlies the cavity for enclosing the cavity and maintaining the pointer therewithin. In a preferred form, the first and second scales are applied to the cover member, which is preferably transparent to enable the pointer to be viewed through the cover member. The first and second gauging surfaces are preferably oriented substantially parallel to each other, and the body preferably defines a pair of end surfaces which extend between and interconnect the first and second gauging surfaces. Each end surface may be formed with an indented finger grip area to facilitate handling of the inclinometer. The first and second scales are preferably arcuate, and are oriented so as to have a common center which is preferably coincident with the pivot axis of the pointer. The scales are arranged so as not to overlap each other, to facilitate ease of reading the inclinometer. In a preferred form, the scales are applied to a ring having a center coincident with the pointer pivot axis.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is an isometric view of a dual scale inclinometer constructed in accordance with the present invention;

FIG. 2 is a front elevation view showing the inclinometer of FIG. 1 in a first position relative to a worksurface to provide a first reading corresponding to the angle of the worksurface; and FIG. 3 is a view similar to FIG. 2, showing the inclinometer in a second position relative to the worksurface to provide a second reading corresponding to the angle of the worksurface.

DETAILED DESCRIPTION OF THE INVENTION

FIG. 1 illustrates an inclinometer 10 for use in obtaining a reading corresponding to the angle of a worksurface, shown at 12. Inclinometer 10 includes a body 14 which defines a first flat gauging surface 16 and a second flat gauging surface 18. Gauging surfaces 16 and 18 are parallel to each other, and define opposite sides of body 14. Gauging surfaces 16 and 18 are substantially equal in length, and a pair of end surfaces 20, 22 extend between and interconnect gauging surfaces 16 and 18. End surfaces 20 and 22 are perpendicular to gauging surfaces 16 and 18 and are substantially equal in length, such that body 14 defines a substantially rectangular square shape when viewed in elevation as shown in FIGS. 2 and 3. As also shown in FIGS. 2 and 3, end surfaces 20, 22 define arcuate recesses 24, 26, respectively, which function as finger grips to facilitate handling of inclinometer 10. Indentation 24 in end surface 20 is offset from the centerline of body 20 toward gauging surface 16, and indentation 26 in end surface 22 is offset a similar distance from the centerline of body 14 toward gauging surface 18.

Body 14 defines an outwardly facing internal cavity defined by a peripheral lip 28, within which a pointer 30 is located. A pivot pin 32 is formed integrally with body 14, and an opening is formed in pointer 30 for receiving pivot pin 32, such that pointer 30 is pivotably mounted to body 14 for movement about a pivot axis defined by pivot pin 32. Alternatively, pivot pin 32 may be a separate component in the form of an axle mounted to body 14. Pointer 30 defines a counterweight portion 34 and a pointer arm 36 extending from counterweight portion 34. Pivot pin 32 extends substantially parallel to gauging surfaces 16, 18, such that counterweight portion 34 is continually biased downwardly by gravity to thereby bias pointer arm 36 toward a vertical position.

A cover plate 38 is mounted to the outer end of lip 28, so as to enclose the internal cavity defined by body 14 within which pointer 30 is located. Cover plate 38 functions to maintain pointer 30 in engagement with pivot pin 32. Cover plate 38 defines a circular raised outer edge 40, as well as a circular raised inner lip 42 which is concentric with outer edge 40. In this manner, cover plate 38 defines an outer ring area 44 between outer edge 40 and inner lip 42, and a circular inner area 46 enclosed by inner lip 42. Typically, a decal or the like is placed in inner area 46 for concealing counterweight portion 34 of pointer 30, and the outer end of pointer arm 36 is visible in outer ring area 44. The center of each of raised outer edge 40 and raised inner lip 42 is coincident with the pivot axis defined by pivot pin 32. In this manner, the outer end of pointer arm 36 is visible within outer ring area 44 at any position of inclinometer 10.

As shown in FIGS. 2 and 3, first and second scales 48, 50, respectively, are applied to outer ring area 44. Scale 48 is calibrated in degrees so as to interact with pointer arm 36 to provide a degree reading, and scale 50 is calibrated in pitch increments (typically in inches of rise per foot of run) so as to interact with pointer arm 36 to provide a pitch reading. Scales 48 and 50 are both arcuate and the radius of each scale is coincident with the pivot axis of pointer 30 as defined by pivot pin 32. The zero point of scale 48 is perpendicular to gauging surface 18, and the zero point of scale 50 is perpendicular to gauging surface 16. Since gauging surfaces 16 and 18 are parallel to each other, the zero point of each of scales 48 and 50 is perpendicular to each of gauging surfaces 16, 18. Scale 48 provides a total range of 180°, i.e. 90° on either side of zero. Scale 50 provides a reading of 24 inches per foot on either side of zero. Scales 48 and 50 are applied to outer ring area 44 so as not to overlap each other.

In operation, inclinometer 10 functions as follows in order to provide a reading corresponding to the inclination of a generally upwardly facing surface, such as worksurface 12. To measure the angle of worksurface 12, the user positions inclinometer 10 such that gauging surface 18 rests on worksurface 12, as shown in FIG. 2. Counterweight portion 34 of pointer 30 functions to place pointer arm 36 in a vertical position, and the user obtains a reading of the angle of inclination of worksurface 12 by observing the position of pointer arm 36 relative to scale 48. Scale 50 is not used when inclinometer 10 is in the position of FIG. 2. To obtain a reading of the pitch of worksurface 12, the user places inclinometer 10 in a position as shown in FIG. 3 in which gauging surface 16 rests on worksurface 12. Again, counterweight portion 34 of pointer 30 functions to move pointer arm 36 to a vertical position, and the user determines the pitch of worksurface 12 by observing the position of pointer arm 36 relative to scale 50. Scale 48 is not used when inclinometer 10 is placed in its FIG. 3 position. Alternatively, either of gauging surfaces 16, 18 can be engaged with a generally downwardly facing surface, such as the underside of a member, to obtain an angle or pitch reading.

Inclinometer 10 can also be used by engaging either end surface 20 or end surface 22 with a surface, to obtain an indication of the angle or pitch of the surface relative to vertical.

In addition, it should be understood that an indicator other than pointer 30 may be used to obtain the angle or pitch reading from scales 48, 50. For example, an indication may be obtained using a bubble vial mounted to a carrier rotatably engaged with a body such as 14, with the user rotating the carrier to provide an indication when the bubble vial reads level. The dual scale feature of the present invention provides the ability to obtain two different readings corresponding to the angle of a surface, regardless of the nature of the indicator arrangement used to indicate the readings.

It can thus be appreciated that inclinometer 10 provides an efficient arrangement for obtaining two different direct readings corresponding to the angle of inclination of a worksurface utilizing the same instrument. While inclinometer 10 has been shown and described in obtaining readings of degrees and pitch corresponding to the angle of a worksurface, it should be understood that any other combination of readings, as desired, can be obtained utilizing different scales which interact with a pointer when different gauging surfaces are placed on a worksurface. When inclinometer 10 is in use, the operative scale is viewed normally, i.e. not upside down, so as to minimize any mistakes which may be made when reading the operative scale. With this arrangement, there is no need to convert an angle measurement to obtain the pitch of a worksurface or any other characteristic corresponding to the angle of inclination of the worksurface.

In addition, it should be understood that the two different scales, such as 48 and 50, can be applied in other locations on inclinometer 10 than cover plate 38 as shown and described. For example, the scales can be applied to a surface of the body inside or outside the cavity within which pointer 30 is received, or in any other location capable of interacting with a pointer for providing a direct reading.

Various alternatives and embodiments are contemplated as being within the scope of the following claims particularly pointing out and distinctly claiming the subject matter regarded as the invention.

I claim:

1. An inclinometer for providing two different reading corresponding to the angle of a worksurface, comprising:
   a body; and
   an indicator arrangement carried by the body, wherein the indicator arrangement includes first and second scales calibrated differently from each other, and a single indicator member movably mounted relative to the body and biased toward a predetermined position relative to the body, wherein the single indicator member is positioned relative to the body and the first and second scales so as to interact with the first scale to provide a first reading corresponding to the angle of the worksurface when the body is engaged with the worksurface in a first position, and so as to interact with the second scale to provide a second reading corresponding to the angle of the worksurface when the body is engaged with the worksurface in a second position.

2. The inclinometer of claim 1, wherein the body defines a pair of gauging surfaces, wherein a first one of the gauging surfaces is engaged with the worksurface when the body is in the first position and wherein a second one of the gauging surfaces is engaged with the worksurface when the body is in the second position.

3. The inclinometer of claim 2, wherein the indicator comprises a pointer having a counterweight portion and an elongated arm extending from the counterweight portion, and wherein the pointer is pivotably mounted to the body for movement about a pivot axis located between the counterweight portion and the elongated arm.

4. The inclinometer of claim 2, further comprising an enclosure associated with the body for enclosing the indicator.

5. The inclinometer of claim 4, wherein the enclosure comprises a cavity defined by the body within which the indicator is located, and a cover member overlying the cavity.

6. The inclinometer of claim 5, wherein the first and second scales are provided on the cover member.

7. An inclinometer for providing two different readings corresponding to the angle of a worksurface, comprising:

a body defining a first gauging surface and a second gauging surface;

a single indicator movably mounted to the body for providing an indication of a predetermined orientation;

a first scale carried by the body and oriented relative to the first gauging surface so as to interact with the single indicator to provide a first reading when the first gauging surface is placed on the worksurface; and a second scale carried by the body, wherein the second scale is calibrated differently than the first scale and is oriented so as to interact with the single indicator to provide a second reading when the second gauging surface is placed on the worksurface.

8. The inclinometer of claim 7, wherein the first and second gauging surfaces are substantially parallel to each other and wherein the first and second scales are arcuate, wherein the first scale is opposite the first gauging surface and the second scale is opposite the second gauging surface.

9. The inclinometer of claim 8, wherein the indicator comprises a pivotable pointer, and wherein the first and second scales are arranged so as to have a common center which is coincident with a pivot axis about which the pointer is pivotable.

10. The inclinometer of claim 8, wherein the first and second scales are arranged so as not to overlap each other.

11. The inclinometer of claim 10, wherein the first scale comprises a degree scale and the second scale comprises a pitch scale.

12. The inclinometer of claim 8, wherein the body further defines a pair of end surfaces extending between the first and second gauging surfaces.

13. The inclinometer of claim 12, further comprising an indented finger grip associated with each end surface.

14. The inclinometer of claim 13, wherein the indented finger grip associated with a first one of the end surfaces is located toward the first gauging surface and wherein the indented finger grip associated with a second one of the end surfaces is located adjacent the second gauging surface.

15. In an inclinometer having a body, an indicator member movably mounted to the body, a first gauging surface associated with the body and a first scale for interacting with the indicator member for providing a first reading corresponding to the angle of a worksurface, the improvement comprising:

a second gauging surface associated with the body; and a second scale, separate from the first scale and calibrated differently than the first scale, positioned so as to interact with the same indicator member as which interacts with the first scale, for providing a second reading corresponding to the angle of the worksurface when the second gauging surface is placed on the worksurface.

* * * * *